Patented June 27, 1944

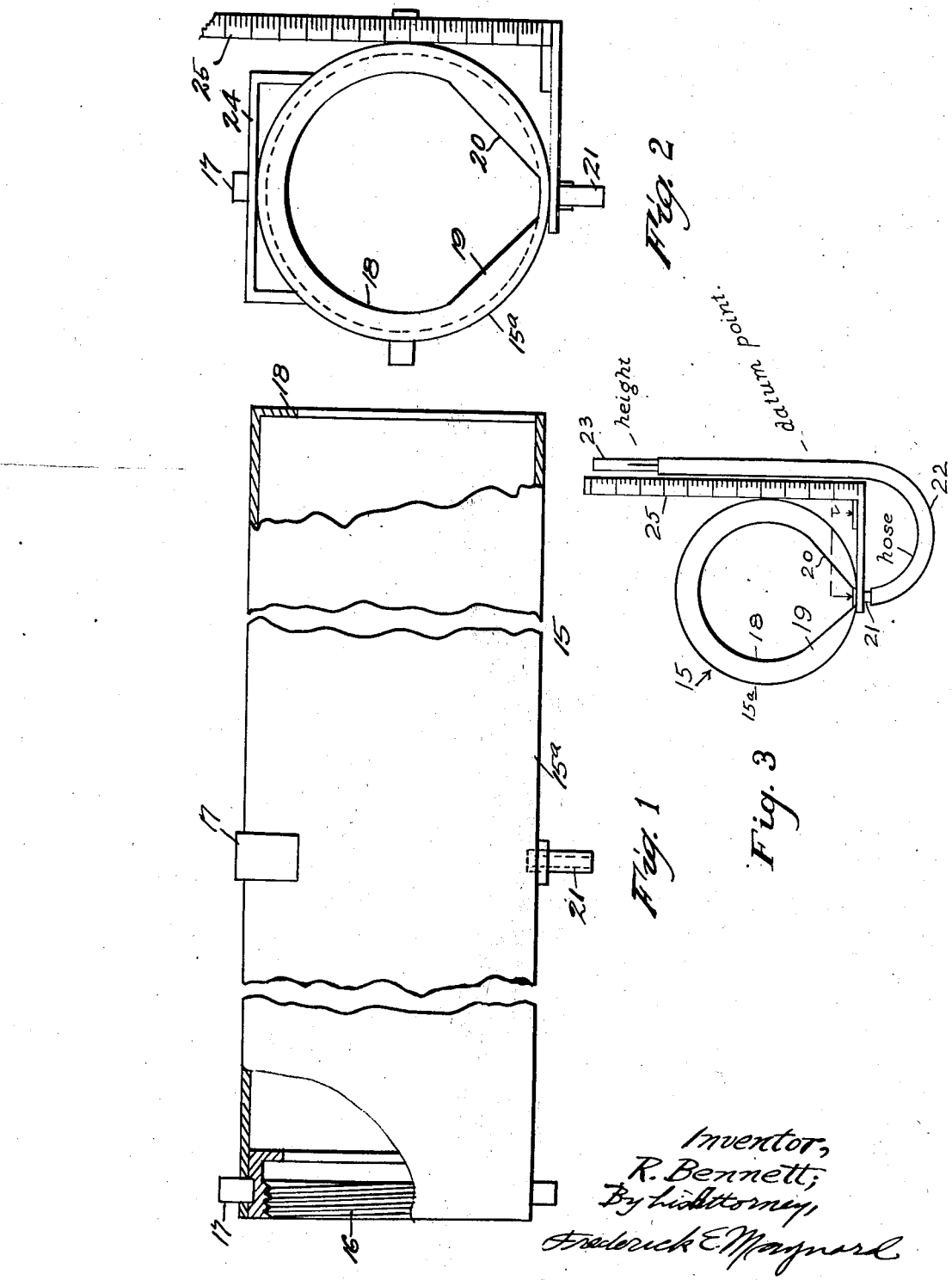

2,352,157

UNITED STATES PATENT OFFICE 2,352,157

FLUID METER

Richard Bennett, Phoenix, Ariz.

Application December 9, 1941, Serial No. 422,260

2 Claims. (Cl. 73—215)

This invention is a gage or meter device to show the rate of flow of liquid in a given apparatus or system as for example at a hydrant of a water distributing system.

The invention consists in certain advancements in the art set forth in the ensuing disclosure and having, with the above, additional objects and advantages as hereinafter developed, and whose constructions, combinations and subcombinations, and details of means and of the method, and the manner of operation will be made manifest in the following description of the herewith illustrative embodiment; it being understood that modifications, variations and adaptations may be resorted to within the spirit, principle and scope of the invention as it is more particularly claimed presently.

Figure 1 is a side elevation of a broken-away rate measuring indicator. Figure 2 is a discharge-end view thereof. Figure 3 is an end elevation of the meter and its attached rating tube.

The hydrant gage or rating instrument 15 includes a barrel 15a threaded at 16 to screw onto the usual steamer nozzle of a given hydrant and has spanner studs 17 near one end and the opposite end of the barrel has a nearly annular, indirected choke flange 18 interrupted at the bottom to form a datum point at the line of the bore of the barrel. The opposite edges 19—20 of the choke flare upwardly and outwardly from the datum point at a suitable angle to give a free flow weir function to the outlet capacity. After the outlet reaches free capacity flow then the closed pipe or body device meters pressure flow. At a suitable distance back from the choke 18 there is provided a down nipple 21 for reception of the near end of a flexible rating tube 22 whose opposite end has a short, level-disclosing gage glass, or equivalent, 23 which is used to determine the flow-pressure height above the datum point, which is level with the bottom of the bore of the barrel at the outlet thereof. A bench 24 is fixed to the barrel to facilitate use of a level to set the barrel true. At one side of the barrel is a fixed vertical scale 25 related to the datum point and against the calibrations of which the gage glass fluid levels are read. The calibrations may be on any suitable basis.

What is claimed is:

1. In a system of the class described and for attachment to a fluid outlet device, a free flow and pressure flow metering instrument including a closed receiving barrel for fluid from the device, a flexible tube leading from the bottom of the barrel and having on the tube's distal end a level disclosing means, a free weir type choke in the barrel and being open down to a datum point at the bottom of the barrel bore for free discharge, and a scale having a fixed relation to the datum point of the barrel and as to which scale the said disclosing means determines the fluid height, in suitable units, from the datum point; the closed barrel operative to effect pressure flow discharge in the meter.

2. A free-flow and pressure-flow measuring metering instrument including a fluid receiving and discharge barrel connectable to a source of flow of fluid and having an internal choking flange near the discharge opening of the barrel and which flange is interrupted at the bottom at the datum point in the line of the bore surface of the barrel, a scale having a fixed relation to the datum point of the barrel bore and indexed in suitable units, and a device leading from the bottom of the barrel at a point well back from the choke and including a level disclosing means and which means is adjustable in vertical position as to the said scale; the barrel being closed except for the choked opening whereby to effect both free-flow or weir function measure and pressure-flow measure when the choked outlet is filled.

RICHARD BENNETT.